(No Model.)
L. A. FORT.
CAR MOVER.
No. 413,750. Patented Oct. 29, 1889.
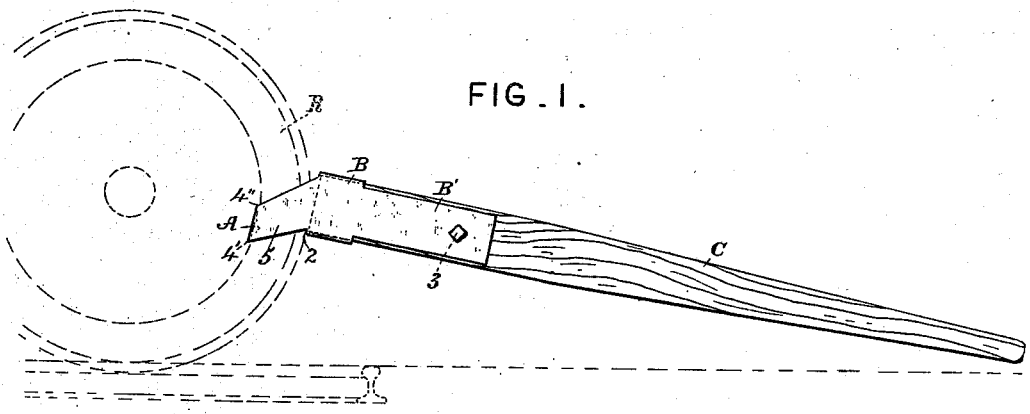
FIG. I.
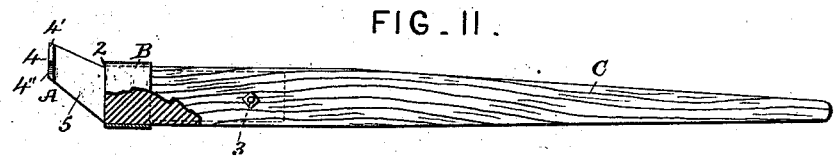
FIG. II.
FIG. III.
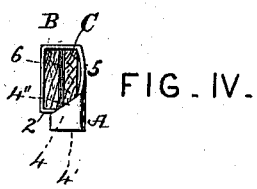
FIG. IV.
Attest:
Geo. T. Smallwood,
Jas. K. McCathran
Inventor:
Laurens Adolphus Fort
by Chas. J. Hedrick
his attorney

UNITED STATES PATENT OFFICE.

LAURENS ADOLPHUS FORT, OF RALEIGH, NORTH CAROLINA.

CAR-MOVER.

SPECIFICATION forming part of Letters Patent No. 413,750, dated October 29, 1889.

Application filed August 9, 1889. Serial No. 320,251. (No model.)

*To all whom it may concern:*

Be it known that I, LAURENS ADOLPHUS FORT, a citizen of the United States, residing at Raleigh, in the county of Wake and State of North Carolina, have invented certain new and useful Improvements in Car-Movers, of which the following specification is a full, clear, and exact description.

This invention relates to the implements or levers for starting or moving railroad-cars by hand, such implements being known in a variety of forms and comprising, in general, a handle-bar or lever and means for taking hold of the rim of one of the car-wheels, so that the same may be turned by power applied to the said handle-bar or lever.

The present invention comprises severally and collectively the new or improved constructions, arrangements, or combinations of parts hereinafter particularly pointed out.

Said invention secures or tends to secure lightness and strength, along with simplicity of structure, ease of adjustment or manipulation, efficiency in operation, and economy of manufacture.

In the accompanying drawings, which form part of this specification, Figure I is a side view of a car-mover constructed in accordance with the invention, showing the same applied to the rim of a car-wheel. Fig. II is a view, partly in section, of the said car-mover from the opposite side, and Figs. III and IV are respectively an edge view and end view of the same.

In connection with a hook A to enter behind the rim (indicated in dotted lines at R in Fig. I) an open-ended socket or ferrule B is employed on the handle-bar C of the implement, the hook and open-ended socket being so placed relatively to each other that an edge 2 of the socket B forms a dog or biting-edge to take hold of the rim on its outer surface. By thus employing an open-ended socket the weight of the head of the implement (such head being composed of the socket, dog, and hook) is diminished by absence of dead metal at the end, while at the same time a very efficient dog and one not apt to break is secured and the combined socket and dog is very easy to make. As shown, it will be observed that the biting-edge 2 is in line with one of the walls of the socket, and this arrangement generally is included in the invention, as it secures an important advantage in respect to the strength of the instrument, the stress on the dog in use being communicated to the socket in such manner as to be best resisted thereby. The ferrule or socket B, as shown, encircles the handle for a comparatively short distance, and is provided with a plate B', which lies along the side of the handle, and is fastened thereto by a bolt 3.

This invention as far as described may be usefully employed with a suitably-arranged hook of any appropriate description; but the invention also comprises certain new or improved constructions or arrangements of hook as follows in connection with any appropriate socket, as well as the combination of the improved hook with the new or improved socket and dog.

The hook A is composed of a point 4 and a body or connecting member 5, which latter, instead of running in a direct line with the handle-bar C, is arranged obliquely thereto, both top and bottom edges being oblique, as clearly indicated. This construction and arrangement makes a stronger hook than the straight arrangement, as a greater portion of the stress in the use of the implements is transmitted lengthwise of the said hook-body 5. The point of the hook with this arrangement may be of any desired depth to give the necessary strength, but preferably is about half the depth of the socket, as shown, that depth being considered sufficient. The point 4 of the hook may have the top and bottom edges extend square across like the lower edge 4', as seen in Fig. IV; but it is an improvement to have one at least of such edges sloped from the base of the hook-point 4 (where it joins the body or connecting member 5) outward like the upper edge 4'', as seen in Fig. IV. One advantage of this is, that when the said sloping edge is pressed against the inside of the rim the slope prevents or renders less likely the application of the stress to the extreme end of the point, and it also renders the point stronger with the same amount of metal therein. It further facilitates removal of the implement from the wheel, as it tends to force the inner end of the implement away from the wheel, this tendency being easily overcome, however, when it is desired to retain the hold on the wheel. The hook A, as shown, has two bearing-edges 4' and 4'', one above and one below the dog or biting-edge 2, and will operate to catch the wheel by moving the handle-bar either up or down after applying the implement to the car-wheel, and can thus be used on a wheel on either side of the car to move it in either direction.

The implement can be used in the position shown in Fig. I or in the reverse position, the edge 4' being the top edge of the hook.

In the new or improved car-mover, as shown, it will be observed that the hook-point 4 in front of the open-ended socket B is so constructed and arranged that a wedge, as indicated at 6, Fig. IV, can be driven into the end of the wooden handle-bar C to secure it more firmly in the socket. Such a car-mover is within the invention generally, irrespective of the precise construction and arrangement of the dog 2 and hook A, as well as when one or more of the special features in the construction and arrangement of these parts as hereinbefore described are employed.

I claim as my invention or discovery—

1. In a car-mover, and in combination with a hook to enter behind the rim of the car-wheel, the open-ended socket to receive the handle-bar of the implement, provided with a dog or biting-edge formed by an edge of said socket, substantially as described.

2. In a car-mover, and in combination with a hook to enter behind the rim of the car-wheel, a socket to receive the handle-bar of the implement, provided with a dog or biting-edge in line with a wall of said socket, substantially as described.

3. In a car-mover, and in combination with a socket to receive the handle-bar, provided with a dog, a hook composed of a point arranged in front of said socket and dog, and a body or member connecting the said point with the said socket and obliquely disposed in (approximately at least) a plane parallel with the length of said socket, the top and bottom edges of said body or member being both oblique to the length of the said socket, substantially as described.

4. In a car-mover, and in combination with a socket to receive the handle-bar, provided with a dog, and the hook-body or connecting member, the hook-point transverse to the length of said socket, arranged in front of said dog, and having one at least of its top and bottom edges sloped from the base of said point outward, substantially as described.

5. In a car-mover, a socket with a dog at one edge thereof, in combination with a hook having its point opposite said dog and an obliquely-disposed body or connecting member between said point and said socket, substantially as described.

6. A car-mover comprising a handle-bar, an open-ended socket provided with a dog, and a hook having its point arranged in front of said socket and dog, leaving the open front end of said socket exposed for driving a wedge into the handle-bar, substantially as described.

7. The head of a car-mover, comprising the open-ended socket provided with a dog at its front end, the obliquely-disposed hook-body projecting forward from said socket, and the hook-point projecting laterally from said hook-body in front of said socket and dog, substantially as described.

8. The head of a car-mover, comprising the open-ended socket provided with a dog at its front end, a hook-body projecting forward from said socket, and a hook-point projecting laterally from said hook-body and front of said socket and dog, and having its top and bottom edges one above and the other below the said dog, so as to catch the car-wheel when said head, after application to the rim of said wheel, is moved either up or down, substantially as described.

9. The head of a car-mover, comprising a socket to receive the handle-bar, open at its front end also, and provided with a dog at the said front end, and a hook having its point arranged in front of said socket and dog, substantially as described.

In testimony whereof I have signed this specification in the presence of two witnesses.

LAURENS ADOLPHUS FORT.

Witnesses:
T. R. PURNELL,
CHAS. A. GOODWIN.